United States Patent
Zeng et al.

(10) Patent No.: US 10,560,143 B2
(45) Date of Patent: Feb. 11, 2020

(54) DETECTION OF INTERMODULATION ISSUES AND TRANSMISSION SCHEME CONFIGURATION TO REMEDY INTERMODULATION ISSUES

(71) Applicant: Apple Inc., Cupertino, CA (US)

(72) Inventors: Wei Zeng, San Diego, CA (US); Haijing Hu, Beijing (CN); Dawei Zhang, Saratoga, CA (US); Xiangying Yang, Cupertino, CA (US); Haitong Sun, Irvine, CA (US); Christian W. Mucke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/117,192

(22) Filed: Aug. 30, 2018

(65) Prior Publication Data
US 2019/0081657 A1 Mar. 14, 2019

Related U.S. Application Data

(63) Continuation-in-part of application No. PCT/CN2017/101250, filed on Sep. 11, 2017.

(30) Foreign Application Priority Data

Sep. 27, 2017 (CN) .......................... 2017 1 0890793
Nov. 17, 2017 (CN) .......................... 2017 1 1146329

(51) Int. Cl.
*H04B 1/71* (2011.01)
*H04B 1/711* (2011.01)
(Continued)

(52) U.S. Cl.
CPC ........... *H04B 1/711* (2013.01); *H04B 17/309* (2015.01); *H04W 52/146* (2013.01);
(Continued)

(58) Field of Classification Search
CPC ... H04B 17/309; H04B 1/711; H04W 52/146; H04W 52/365; H04W 72/0453
See application file for complete search history.

(56) References Cited

U.S. PATENT DOCUMENTS 8,462,724 B1 6/2013 Immonen
9,025,478 B2 5/2015 Jung
(Continued)

FOREIGN PATENT DOCUMENTS

WO WO 2010/151849 A2 12/2010
WO WO 2014/047894 A1 4/2014
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.3.0, Jun. 23, 2017; 331 pages.
(Continued)

*Primary Examiner* — Kabir A Timory
(74) *Attorney, Agent, or Firm* — Kowert Hood Munyon Rankin and Goetzel PC; Jeffrey C. Hood; Luke S. Langsjoen

(57) ABSTRACT

Apparatuses, systems, and methods for a wireless device to detect intermodulation issues and configure a transmission scheme to remedy detected intermodulation issues. The wireless device may perform measurements on a downlink carrier while one uplink carrier is scheduled for the wireless device. The wireless device may also perform measurements on the downlink carrier while two uplink carriers are scheduled for the wireless device. The wireless device may provide information based on those measurements to a serving base station. The base station may determine that an intermodulation issue is occurring at the wireless device (Continued)

based on the information provided, and may configure the wireless device to use a single uplink carrier at a time based at least in part on the intermodulation issue.

20 Claims, 9 Drawing Sheets

(51) Int. Cl.
    *H04W 52/14*     (2009.01)
    *H04W 72/04*     (2009.01)
    *H04B 17/309*     (2015.01)
    *H04W 52/36*     (2009.01)
    *H04W 72/08*     (2009.01)

(52) U.S. Cl.
    CPC ..... *H04W 52/365* (2013.01); *H04W 72/0453* (2013.01); *H04W 72/082* (2013.01)

(56) References Cited

U.S. PATENT DOCUMENTS

| | | | |
|---|---|---|---|
| 9,143,303 B1 | 9/2015 | Marupaduga | |
| 9,510,356 B2 | 11/2016 | Isokangas | |
| 9,743,362 B1 | 8/2017 | Tian | |
| 2013/0051261 A1* | 2/2013 | Kazmi | H04B 7/0693 370/252 |
| 2015/0215947 A1 | 7/2015 | Kaukovuori | |
| 2015/0245365 A1* | 8/2015 | Isokangas | H04W 72/1226 455/423 |
| 2016/0302209 A1 | 10/2016 | Behravan | |
| 2016/0345193 A1 | 11/2016 | Takahashi | |
| 2018/0019784 A1* | 1/2018 | Tidestav | H04B 1/525 |

FOREIGN PATENT DOCUMENTS

| | | | |
|---|---|---|---|
| WO | WO 2016/075046 A1 | 5/2016 |
| WO | WO 2016/082896 A1 | 6/2016 |

OTHER PUBLICATIONS

Notice of Preliminary Rejection, Korean Patent Application No. 10-2018-0102811, dated Jul. 17, 2019, six pages.

Extended European Report, European Application No. 18191503.4, dated Jan. 29, 2019, 9 pages.

International Search Report and Written Opinion, Application No. PCT/CN2017/101250, dated May 15, 2018, 9 pages.

* cited by examiner

US 10,560,143 B2

DETECTION OF INTERMODULATION ISSUES AND TRANSMISSION SCHEME CONFIGURATION TO REMEDY INTERMODULATION ISSUES

PRIORITY INFORMATION

This application is a continuation-in-part of Patent Cooperation Treaty patent application number PCT/CN2017/101250, entitled "Detection of Intermodulation Issues and Transmission Scheme Configuration to Remedy Intermodulation Issues," filed Sep. 11, 2017, and further claims priority to Chinese patent application number 201710890793.2, entitled "Detection of Intermodulation Issues and Transmission Scheme Configuration to Remedy Intermodulation Issues," filed Sep. 27, 2017, and Chinese patent application number 201711146329.9, entitled "Detection of Intermodulation Issues and Transmission Scheme Configuration to Remedy Intermodulation Issues," filed Nov. 17, 2017, all of which are hereby incorporated by reference in their entirety as though fully and completely set forth herein.

FIELD

The present application relates to wireless devices, and more particularly to apparatus, systems, and methods for a wireless device to detect intermodulation issues and configure a transmission scheme to remedy detected intermodulation issues.

DESCRIPTION OF THE RELATED ART

Wireless communication systems are rapidly growing in usage. Further, wireless communication technology has evolved from voice-only communications to also include the transmission of data, such as Internet and multimedia content.

In some wireless devices, it may be the case that simultaneous multiple uplink transmissions can occur in separate frequencies, for example when communicating according to multiple wireless communication technologies, or when utilizing carrier aggregation or dual connectivity techniques. Such simultaneous multiple uplink transmissions can generate intermodulation interference, which can cause downlink sensitivity degradation, depending on the band combination in use. Thus, improvements in the field are desired.

SUMMARY

Embodiments relate to apparatuses, systems, and methods to detect intermodulation issues and configure a transmission scheme to remedy detected intermodulation issues.

According to the techniques described herein, a wireless device may measure interference on a downlink carrier during times when communication on one uplink carrier is scheduled for the wireless device, and may also measure interference on the downlink carrier during times when communication on two uplink carriers is scheduled for the wireless device. The interference measurements may include directly measuring the interference (e.g., on resources of the downlink carrier that are configured as zero energy resources), or may include measuring interference as part of another metric that is impacted by interference, such as signal to interference plus noise ratio (SINK) (e.g., on reference signal resources of the downlink carrier).

The difference between the interference measured when communication on one uplink carrier is scheduled for the wireless device and when communication on two uplink carriers is scheduled for the wireless device may be calculated by the wireless device, or the measurements may be provided to a master base station serving the wireless device so that the master base station can calculate the difference. This difference may be substantially representative of the effect of intermodulation interference on the downlink carrier, particularly if filtering/averaging of the interference measurements over time is performed to minimize the overall impact of other factors on the measurements. Accordingly, it may be possible for the wireless device and/or the base station to determine whether an undesired level of intermodulation interference is occurring, e.g., by comparing the calculated difference to a desired threshold.

If it is determined that intermodulation interference is causing a problem, the base station may trigger special handling for the intermodulation issue, for example by configuring the wireless device to utilize just one uplink carrier at a time. If the base station later determines that intermodulation interference is no longer a problem, the base station may decide to rescind the special handling, for example by configuring the wireless device to utilize multiple uplink carriers simultaneously again.

A framework for supporting configuration of transmission schemes to remedy intermodulation issues is also described herein. Such a framework may be used in conjunction with the techniques described herein for detecting intermodulation issues, or more generally with any other desired techniques for determining whether intermodulation issues are occurring at a wireless device.

According to the framework, a wireless device that is configured to detect intermodulation issues at the wireless device may provide an indication of that capability to its serving base station, e.g., when performing radio resource control (RRC) connection establishment/configuration. The base station may in turn determine whether to configure the wireless device with permission to report such issues, and provide an indication thereof to the wireless device, e.g., similarly during RRC connection setup.

If the wireless device is configured to report intermodulation issues, and the wireless device detects an intermodulation issue, the wireless device may provide an indication of the intermodulation issue to the base station. This may trigger the base station to perform RRC reconfiguration to attempt to resolve the intermodulation issue, e.g., by configuring the wireless device to utilize only one uplink carrier at a time. Similar signaling may be used for the wireless device to report if it determines that an intermodulation issue is resolved and/or for the base station to reconfigure the wireless device to resume possible simultaneous use of multiple uplink carriers.

Additionally, some embodiments described herein may relate to finely grained wireless device capability reporting, e.g., in particular with respect to supported band combinations and channel allocations within band combinations in view of potential intermodulation issues. For example, a wireless device may consider any or all of the network, location, cell type, among various possible considerations, to determine whether various possible band combinations or specific channel allocations within band combinations are or are not supported by the wireless device, and may provide capability information regarding those band combinations or specific channel allocations within band combinations to its serving network accordingly.

Further, in some embodiments it may be possible for network operators to more dynamically handle potential intermodulation issues. For example, a wireless device may be able to report that it has a potential intermodulation issue (e.g., if it is configured to use a band combination that has potential for intermodulation interference), and the base station may dynamically determine whether the potential intermodulation issue warrants mitigation action by the base station (e.g., configuring the wireless device to utilize a single uplink carrier at a time) or the potential intermodulation issue is within tolerable limits. Such dynamic determination may further be based on any or all of the intermodulation order of the potential intermodulation issue, the power head room for each configured uplink carrier of the wireless device, and/or any capabilities of the wireless device for interference handling (e.g., capability to mitigate a certain amount of receiver sensitivity degradation, capability to mitigate interference caused by certain intermodulation orders, etc.), and/or any of various other possible considerations.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
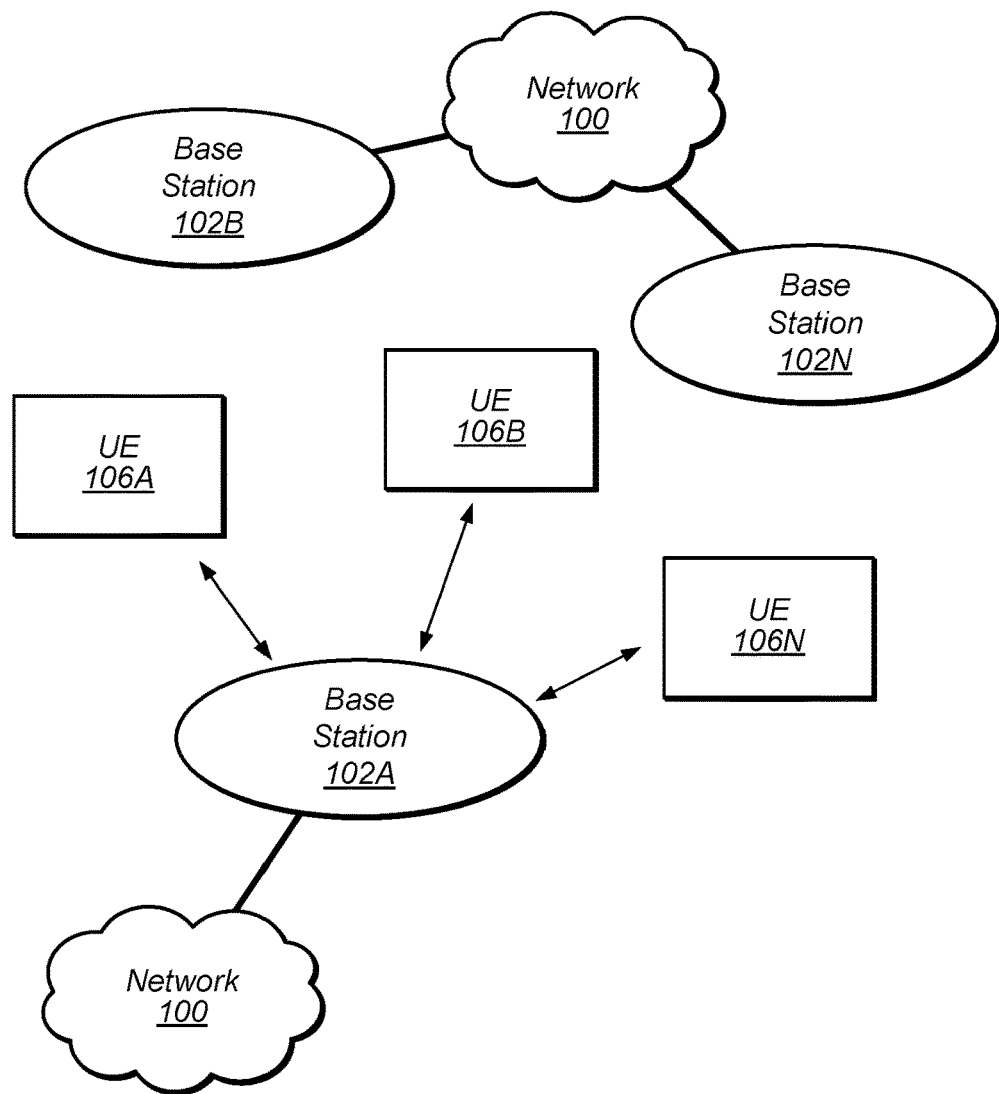
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
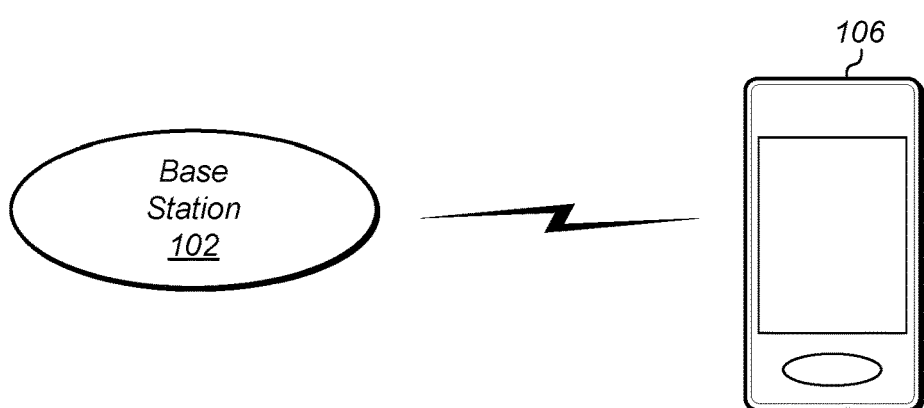
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
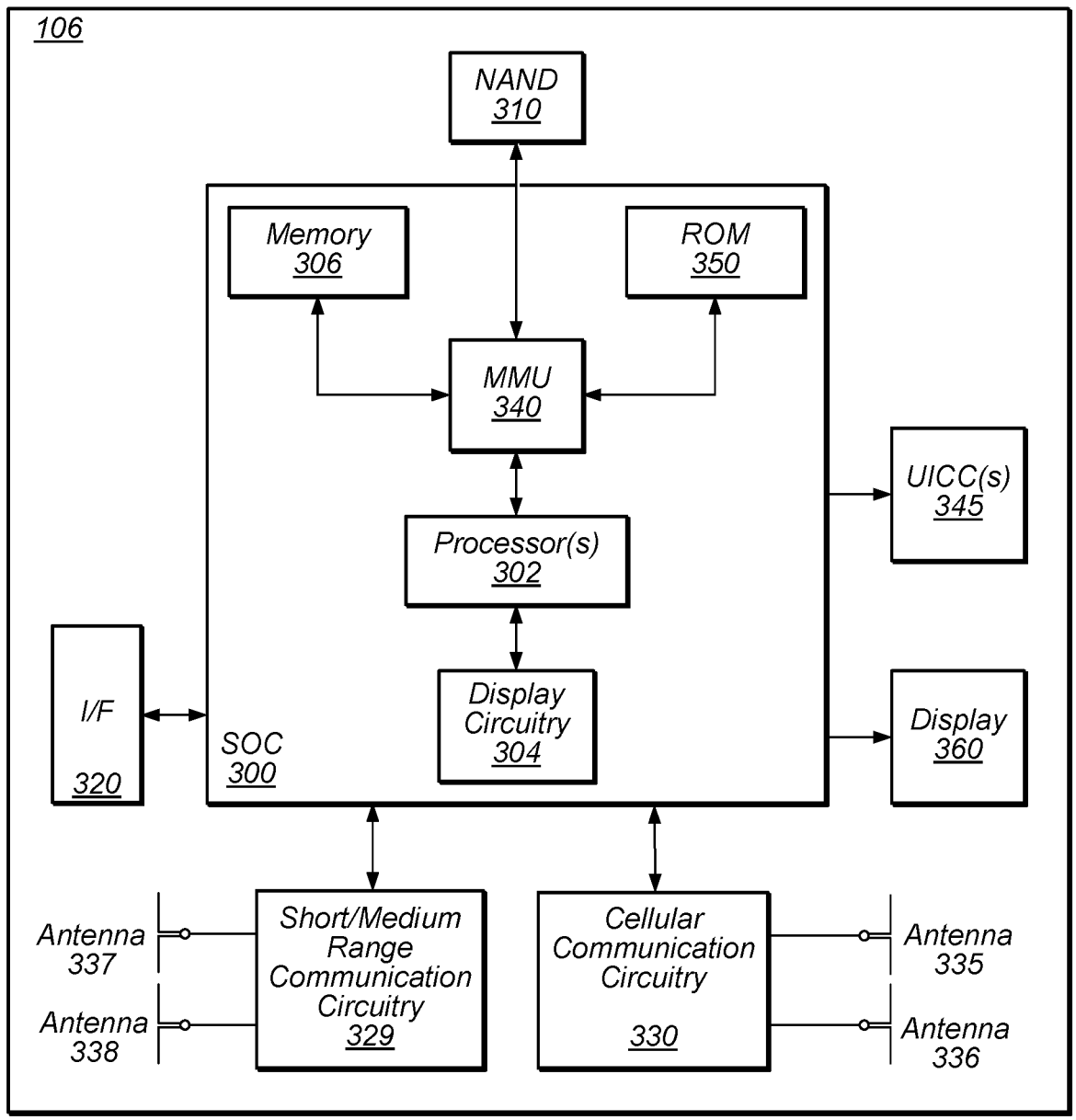
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs.

For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing features for detecting intermodulation issues and/or configuring a transmission scheme to remedy detected intermodulation issues, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
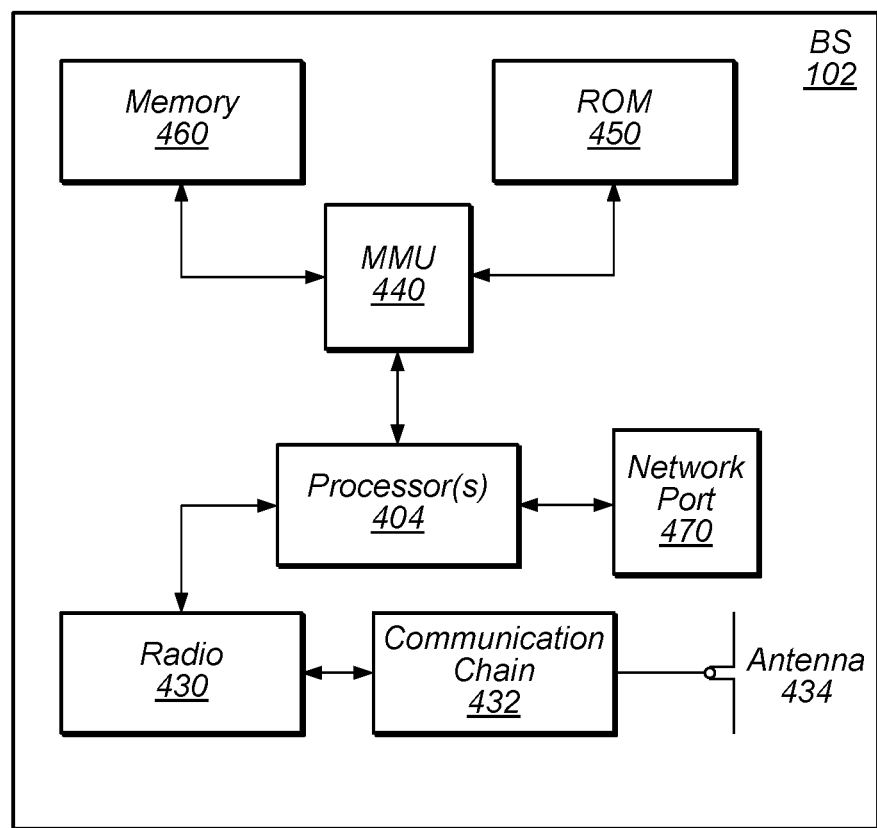
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
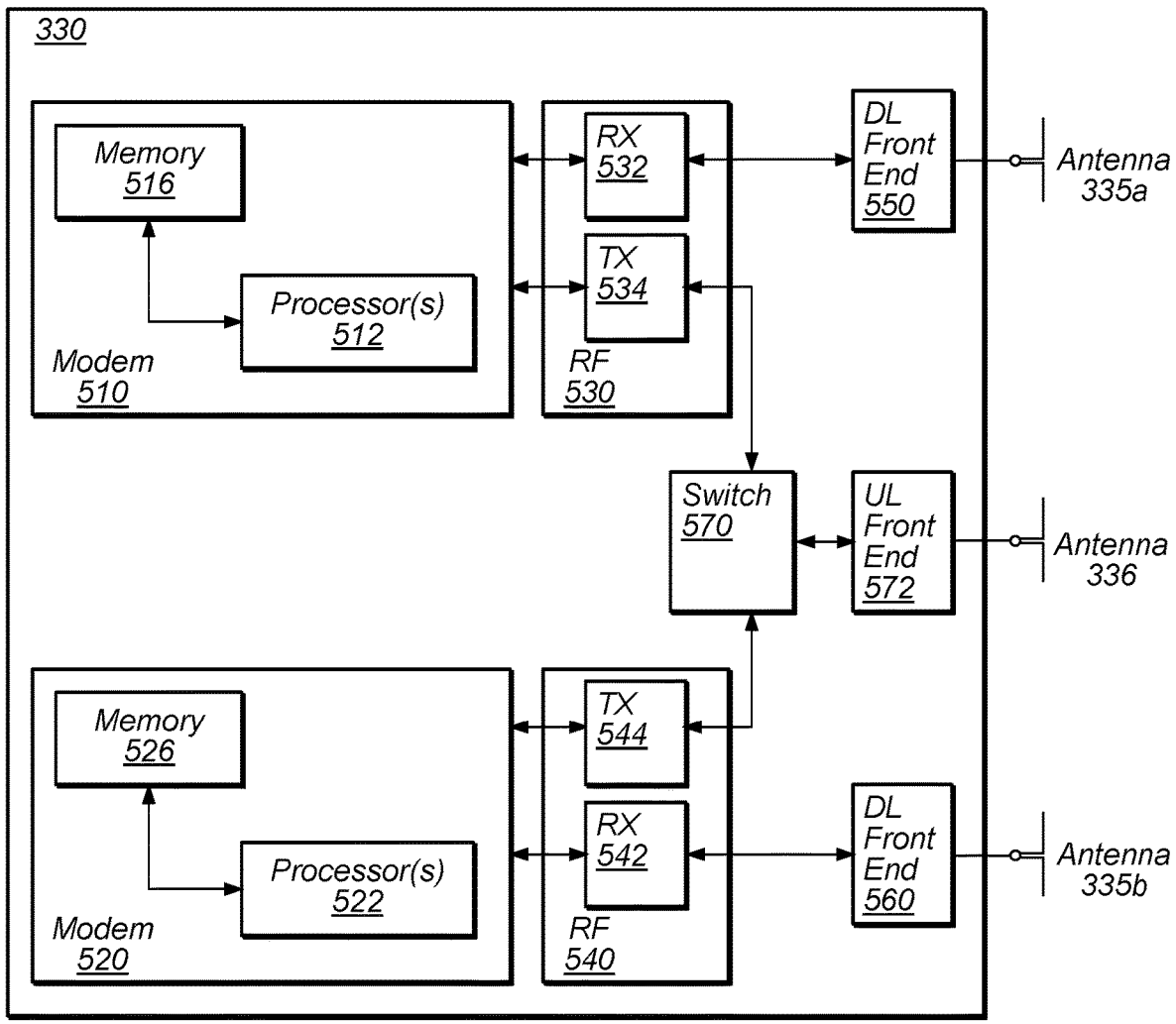
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing features for detecting intermodulation issues and/or configuring a transmission scheme to remedy detected intermodulation issues, as well as the various other techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

Figure 6A:
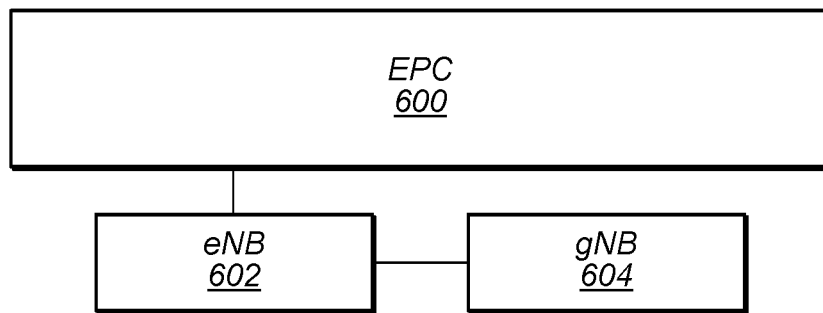
FIG. 6A illustrates an example of connections between an EPC network, an LTE base station (eNB), and a 5G NR base station (gNB), according to some embodiments.
Figure 6B:
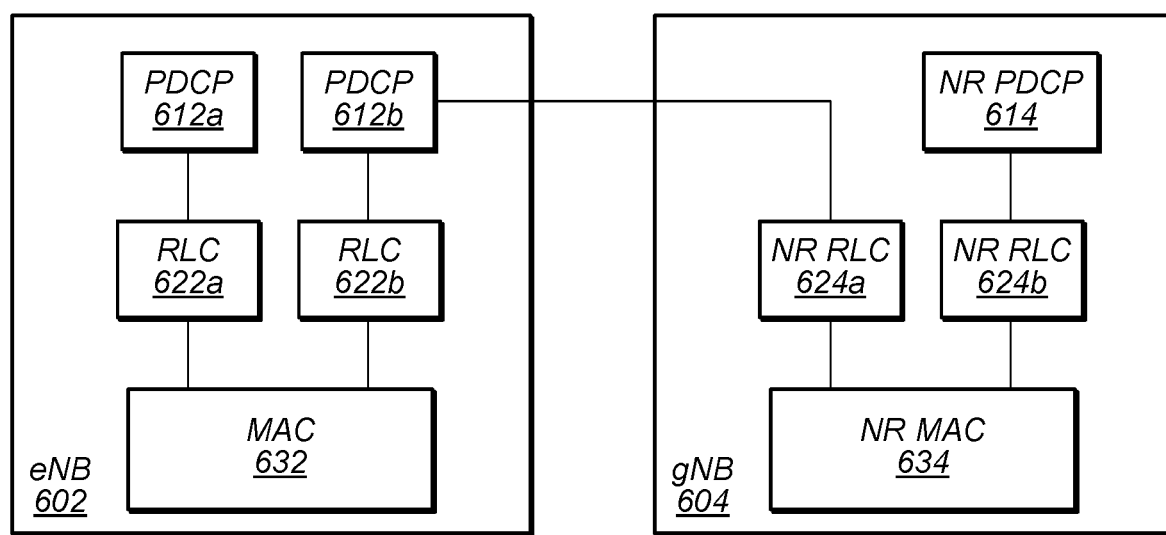
FIG. 6B illustrates an example of a protocol stack for an eNB and a gNB, according to some embodiments.

FIGS. 6A-6B—5G NR Non-standalone (NSA) Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a possible protocol stack for eNB 602 and gNB 604, according to some embodiments. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Note that while the illustrated architecture and protocol stack represent possible NSA architecture and protocol stack options, any number of additional or alternative architecture and/or protocol stack options or variations are also possible. For example, as another possibility, a NRC network may be used, with a gNB acting as a master node (MgNB and a eNB acting as a secondary node (SeNB). Numerous other options are also possible.

In general, a non-stand alone (NSA) implementation may employ dual connectivity in both uplink (UL) and downlink (DL). In other words, dual connectivity may require two active radio links in both UL and DL. In some implementations, depending on frequency band combinations, two (substantially) concurrent UL connections may cause receiver sensitivity degradation at the UE. For example, in some proposed implementations, a UE may be required to support 4 DL and 1 UL connection in LTE on bands 1 (UL: 1920-1980 MHz, DL: 2110-2170 MHz), 3 (UL: 1710-1785 MHz, DL: 1805-1880 MHz), 7 (UL: 2500-2570 MHz, DL: 2620-2690 MHz), and 20 (UL: 832-862 MHz, DL: 791-821 MHz) while (substantially) concurrently supporting 1 DL and 1 UL connection in NR at 3400-3800 MHz. In such implementations, a $5^{th}$ order intermodulation product (IM5) produced at a 5G NR transmitter of the UE from a $2^{nd}$ harmonic of LTE UL band 3 and NR UL may fall into LTE DL band 7 frequencies during (substantially) simultaneous UL operation. Similarly, a $4^{th}$ order harmonic of LTE UL band 20 and NR UL transmission may create a $5^{th}$ order intermodulation product that may interfere with LTE DL band 7 reception and thus desensitize receiving for LTE DL band 7.

In addition, future specifications of NR NSA may require a UE to support co-existence of LTE UL and NR UL within the bandwidth of an LTE component carrier and co-existence of LTE DL and NR DL within the bandwidth of an LTE component carrier. Further, such an implementation may be further required to minimize impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers. Note that such an implementation may also allow for (substantially) simultaneous operation on two or more UL carriers at a given time.

Thus, having the ability to configure a UE to operate on only one uplink carrier at a time may provide a useful mechanism for resolving intermodulation problems while still allowing a device to maintain a dual connectivity configuration, at least according to some embodiments. However, in order to improve the effectiveness of such an ability, it may be useful to be able to detect when intermodulation issues are actually occurring at a wireless device, and to provide a framework for a wireless device to report such issues and to be reconfigured between a single uplink carrier configuration and a multiple uplink carrier configuration. Accordingly, embodiments described herein define systems, methods, and mechanisms for detecting when intermodulation issues (e.g., as a result of dual UL connectivity) are occurring at a UE, and for configuring a transmission scheme (e.g., a single UL carrier transmission scheme) in response to detected intermodulation issues.

FIGS. 7-13—Methods to Detect Intermodulation Issues and to Configure a Transmission Scheme to Remedy Detected Intermodulation Issues As previously noted herein, simultaneous dual uplink transmission in separate frequencies can generate intermodulation interference. Such intermodulation can cause downlink sensitivity degradation, e.g., depending on the combination of bands in use for uplink and downlink communication. There are a number of scenarios in which such intermodulation issues may be possible, potentially including several dual connectivity (e.g., LTE-LTE dual connectivity, NR-NR dual connectivity, LTE-NR dual connectivity) and carrier aggregation (e.g., LTE-LTE carrier aggregation, NR-NR carrier aggregation) scenarios.

As further previously noted, at least in some instances, it may be possible for a wireless device to operate on only one uplink carrier at a time, even when configured with multiple uplink carriers on different frequencies. For example, as previously described herein, 3GPP NR NSA deployments may support such a configuration. Such configurations, as well as configurations in which a wireless device is configured with only one uplink carrier, may collectively be referred to as single uplink transmission configurations for simplicity herein.

In LTE, an RRC procedure that may be referred to as an in-device coexistence (IDC) indication may be used to inform the network (e.g., the E-UTRAN) about IDC problems that can not be solved by the UE itself, as well as provide information that may assist the network when resolving these problems.

For example, a UE may be equipped to communicate using multiple wireless communication technologies, such as LTE, Wi-Fi, Bluetooth, GNSS, etc. Due to potentially extreme proximity of multiple radio transceivers within the same UE, potentially operating on adjacent frequencies or sub-harmonic frequencies, the interference power coming from a transmitter of a collocated radio may in some instances be much higher than the actual received power level of the desired signal for a receiver. Such a situation may cause IDC interference and may generally be referred to as an IDC problem.

A UE that supports IDC functionality may be able to indicate this capability to the network, and the network may then configure (e.g., by dedicated signaling) whether the UE is allowed to send an IDC indication.

When a UE then experiences an IDC problem that it cannot solve by itself and a network intervention is requested, it may send an IDC indication (e.g., via dedicated RRC signaling) to report the IDC problem to its serving base station. The UE may determine whether an IDC problem is occurring in any desired manner, including potentially relying on existing LTE measurements and/or UE internal coordination to assess the interference, and/or using any of various other possible techniques.

In NR, when allowed by the network, a temporary capability restriction request may be sent by the UE to signal the limited availability of some capabilities (e.g., due to hardware sharing, interference, overheating, etc.) to the serving base station. The base station may then confirm or reject the request.

Figure 7:
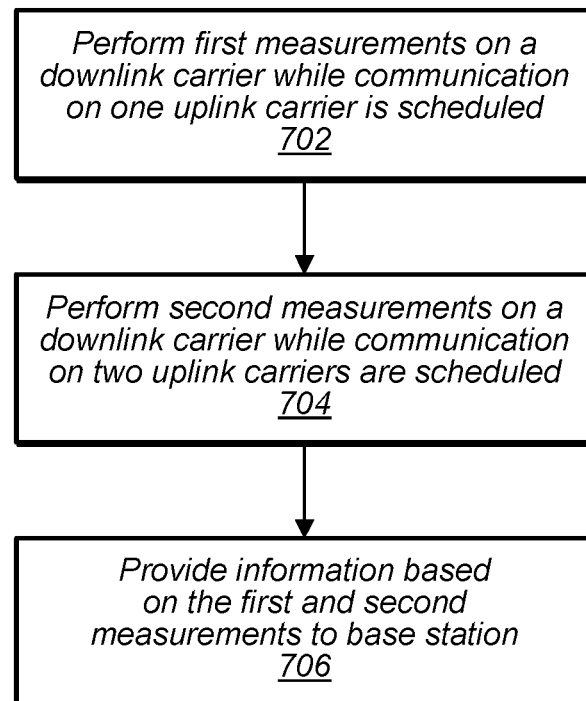
FIGS. 7-8 are flowchart diagrams illustrating example methods for detecting intermodulation issues, according to some embodiments.
Figure 8:
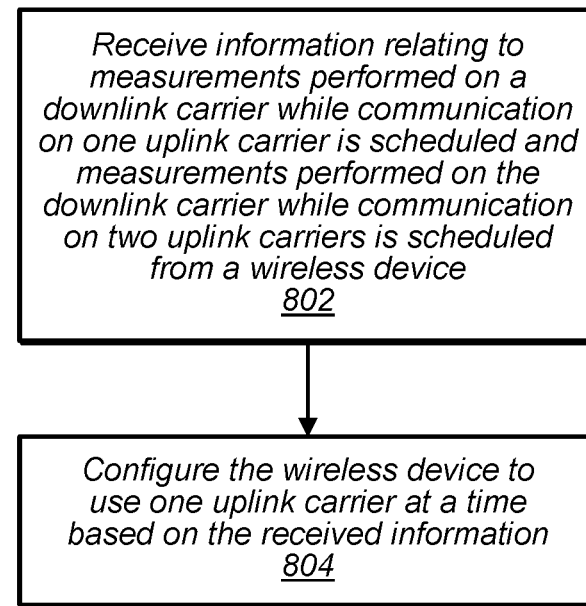
Figure 9:
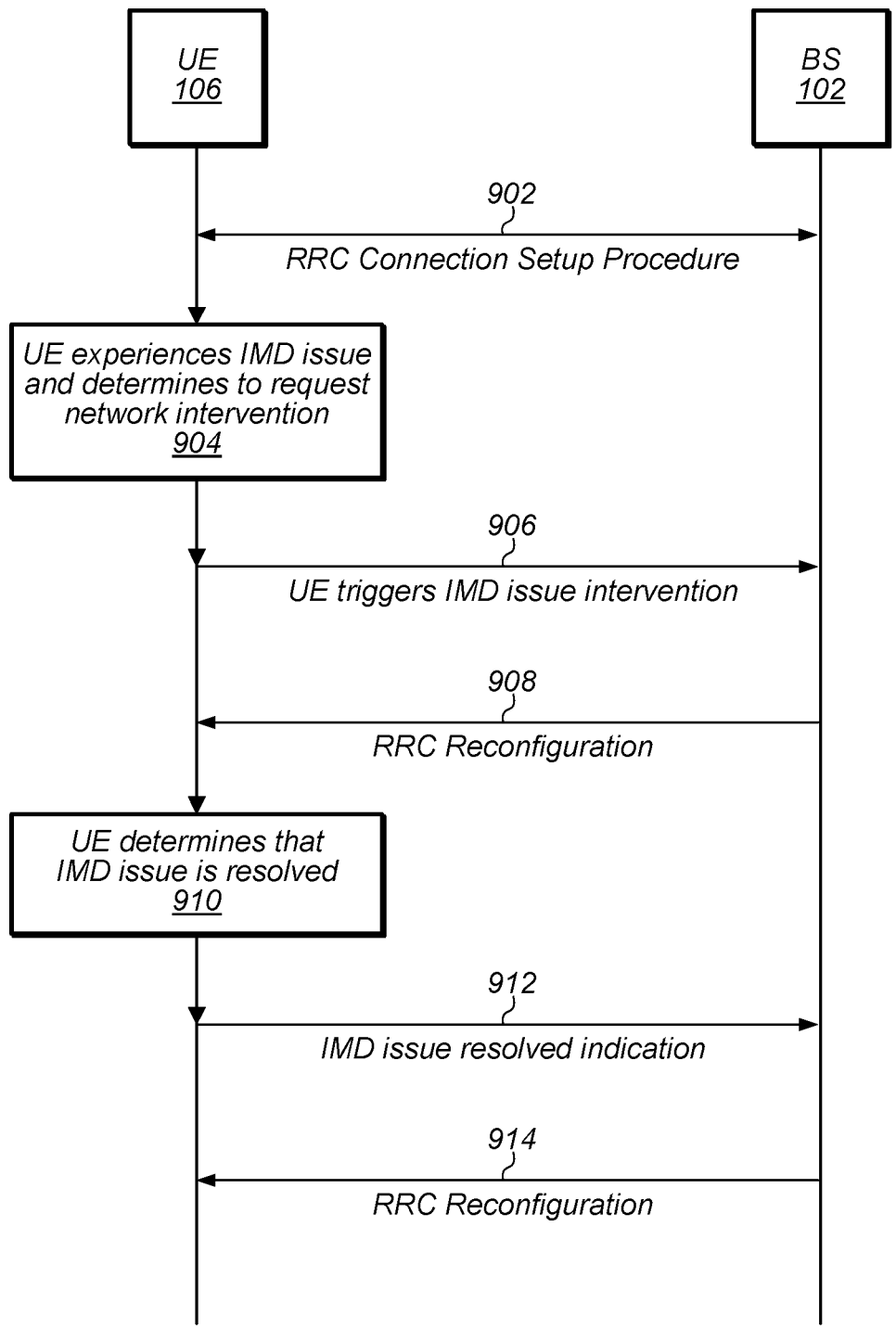
FIG. 9 is a signal flow diagram illustrating an example method for configuring a transmission scheme to remedy detected intermodulation issues, according to some embodiments.

A similar framework can be used to configure a UE to operate in a single uplink transmission mode, or to return to a multiple uplink transmission mode when configured to operate in a single uplink transmission mode, if desired. FIGS. 7-9 are flowchart and signal flow diagrams illustrating such example methods for a wireless device to detect intermodulation issues and configure a transmission scheme to remedy detected intermodulation issues. Aspects of the methods of FIGS. 7-9 may be implemented by a wireless device such as a UE 106 illustrated in various of the Figures herein, a base station such as a BS 102 illustrated in various of the Figures herein, or more generally in conjunction with any of the computer systems or devices shown in the above Figures, among other devices, as desired.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

At 702, a wireless device may perform first measurements on a downlink carrier while one uplink carrier is scheduled for the wireless device. The first measurements may be performed opportunistically (e.g., based on receiving downlink control information indicating that one uplink carrier is scheduled) by the wireless device, and/or may be performed during specific measurement windows/durations in which one uplink carrier is intentionally scheduled for the wireless device to transmit and simultaneously make measurements on its downlink carrier.

At 704, the wireless device may perform second measurements on a downlink carrier while two uplink carriers are scheduled for the wireless device. Similar to the first measurements, the second measurements may be performed opportunistically (e.g., based on receiving downlink control information indicating that two uplink carriers are scheduled) by the wireless device, and/or may be performed during specific measurement windows/durations in which two uplink carriers are intentionally scheduled for the wireless device to transmit and simultaneously make measurements on its downlink carrier.

As one possibility, the measurements may include signal to interference plus noise (SINR) measurements performed based on reference signals (e.g., CSI-RS, TRS, DM-RS, SS, etc.) provided on the downlink carrier. As another possibility, the measurements may include interference measurements performed on zero power (ZP) resources scheduled by the base station on the potentially impacted downlink carrier frequency.

At 706, the wireless device may provide information based on the first and second measurements to a base station. According to some embodiments, this may include providing the actual measurement results for the first and second measurements to the base station.

Alternatively or in addition, the wireless device may provide one or more values calculated based on the first and second measurements to the base station. For example, a difference between SINR values or interference values measured when one uplink carrier is scheduled for the wireless device and when two uplink carriers are scheduled for the wireless device may be calculated, and this difference/delta value may be provided to the base station. The calculation can be performed in the dB domain or the linear domain, as desired.

As a still further possibility, the network may configure the wireless device with an intermodulation threshold, or an intermodulation threshold for the wireless device may otherwise be configured. In such a case, the wireless device may also calculate a difference/delta value between results of the first and second measurements, and may further compare the delta value with the configured intermodulation threshold. If the delta value is greater than (or possibly at least equal to) the configured intermodulation threshold, the wireless device may provide an intermodulation indication configured to indicate that the delta value is greater than (or possibly at least equal to) the configured intermodulation threshold to the base station.

Note that the first and/or second measurements may be averaged/filtered, e.g., for more robust results, if desired. For example, the first and second measurements may be performed on each of multiple opportunities (e.g., over the course of multiple subframes) during a measurement window (e.g., configured by the network or in any other desired manner), and those measurements may be filtered according to any desired filtering technique(s). In such a case, the averaged/filtered measurement results may be used to calculate the delta/difference to be compared with the intermodulation threshold at any given time.

Note that the information based on the first and second measurements may be provided to the base station based on any of various possible scheduling mechanisms. As one possibility, the wireless device may be configured to report the information periodically. As another possibility, the base station may trigger the wireless device to report the information aperiodically, e.g., as desired by the base station. As a still further possibility, the information may be provided based on a trigger at the wireless device, for example if the wireless device determines that the delta value between the results of the first and second measurements is greater than a configured intermodulation threshold.

The method of FIG. 8 may be performed by a base station, e.g., in conjunction with performance of the method of FIG. 7 by a wireless device, according to some embodiments, or may be performed by a base station independently of the method of FIG. 7, as desired. As shown, the method of FIG. 8 may operate as follows.

At 802, a base station may receive information relating to measurements performed on a downlink carrier while one uplink is scheduled and while two uplink carriers are scheduled from a wireless device. The information received may include any of the various possible types of information described herein with respect to FIG. 7, according to some embodiments. For example, the information may include measurement results for measurements on a downlink carrier while one uplink carrier is scheduled for the wireless device, measurement results for measurements on a downlink carrier while two uplink carriers are scheduled for the wireless device, a delta/difference value calculated from such measurements, and/or an indication that a delta/difference value calculated from such measurements is above (or possibly at least equal to) a configured intermodulation threshold, among various possibilities.

The base station may determine that an intermodulation issue is currently occurring at the wireless device based at least in part on the received information. For example, if the information received includes measurement results for SINR and/or interference while one uplink carrier is scheduled for the wireless device and while two uplink carriers are scheduled for the wireless device, the base station may calculate a delta between those results, compare the delta with an intermodulation threshold, and determine that an intermodulation issue is currently occurring at the wireless device if the delta is greater than (or possibly at least equal to) the intermodulation threshold. As another possibility, if the information received includes an indication of a delta between SINR and/or interference while one uplink carrier is scheduled for the wireless device and while two uplink carriers are scheduled for the wireless device, and the indicated delta is greater than (or possibly at least equal to) the intermodulation threshold, the base station may determine that an intermodulation issue is currently occurring at the wireless device. As a still further possibility, if the information received includes an indication that an intermodulation issue is currently occurring at the wireless device, the base station may simply determine that an intermodulation issue is currently occurring at the wireless device based on the indication from the wireless device.

As another possibility, the base station may determine whether an intermodulation issue is currently occurring at the wireless device based at least in part on other types of information received from the wireless device, such as the power head room (PHR), reference signal received quality (RSRQ), and/or reference signal received power (RSRP) indicated by the wireless device in an LTE measurement report. For example, if the UE has good RSRP (e.g., above a RSRP threshold), bad RSRQ (e.g., below a RSRQ threshold), and small PHR (e.g., below a PHR threshold), the base station may determine that an intermodulation issue is currently occurring at the wireless device, as one possibility. As another possibility, if the UE has good RSRP (e.g., above a RSRP threshold), good RSRQ (e.g., above a RSRQ threshold), and large PHR (e.g., above a PHR threshold), the base station may determine that an intermodulation issue is not currently occurring at the wireless device. Any number of additional or alternative arrangements for determining whether an intermodulation issue is currently occurring at the wireless device based on such measurements and/or other considerations are also possible.

As a still further possibility, the base station may determine whether an intermodulation issue is currently occurring at the wireless device based at least in part on an intermodulation order of the intermodulation issue. For example, according to some embodiments, degradation from intermodulation can vary depending on intermodulation order, e.g., such that the lower the intermodulation order, the larger the degradation (e.g., such that IMD-5 might have a smaller impact compared to IMD-3, as one possibility). Such information may be utilized in conjunction with the transmission power currently in use by the wireless device to determine how much receiver sensitivity degradation the wireless device is actually effectively subject to, in some embodiments. For example, the wireless device may report its power head room (e.g., which may be filtered/averaged over a period of time, if desired) for each configured uplink carrier, from which, in combination with the intermodulation order of the potential intermodulation issue, the base station may determine an effective amount of receiver sensitivity degradation for the wireless device.

In some instances, the wireless device may have some interference mitigation capabilities. For example, the wireless device may be able to effectively mitigate up to a certain amount of receiver sensitivity degradation, and/or may be able to effectively mitigate receiver sensitivity degradation from certain orders of intermodulation effects, among various possibilities. According to some embodiments, the wireless device may report such information to the base station, which may in turn utilize such information in determining whether an intermodulation issue is currently occurring at the wireless device such that the wireless device should be configured to use a single uplink carrier at a time, or whether the potential intermodulation issue is sufficiently manageable that the wireless device should be allowed to simultaneously use multiple uplink carriers.

At 804, the base station may configure the wireless device to use one uplink carrier at a time based on the received information, e.g., if it is determined that an intermodulation issue is occurring at the wireless device. This may assist the wireless device to mitigate the intermodulation issue. Note that configuring the wireless device to use one uplink carrier at a time may still allow the wireless device to maintain dual connectivity (e.g., LTE-LTE, NR-NR, or LTE-NR dual connectivity), e.g., by way of use of time division multiplexing (TDM) techniques, frequency division multiplexing (FDM) techniques, higher layer (e.g., MAC, RLC, etc.) multiplexing techniques, or any other desired techniques for enabling multiple uplink connections using only a single uplink carrier at a time, at least according to some embodiments.

Note that the base station may also, e.g., at a later time, determine that the intermodulation issue is resolved (e.g., based at least in part on subsequent measurements and/or any of various other possible considerations) and reconfigure the wireless device to be able to simultaneously use multiple uplink carriers, at least according to some embodiments.

The method of FIG. 9 may be used by a wireless device and a base station to configure a transmission scheme to remedy detected intermodulation issues, according to some embodiments. As shown, the method of FIG. 9 may operate as follows.

At 902, a UE 106 and a BS 102 may perform a radio resource control (RRC) connection setup procedure. As part of the RRC connection setup procedure, the UE 106 may indicate that it supports reporting/detection of intermodulation issues to the BS 102. The BS 102 may indicate (e.g., by dedicated signaling) whether the UE 106 is allowed to report intermodulation issues to the UE 106, and/or whether the UE is allowed to request configuration of a single uplink transmission mode. Note that the BS 102 may be a master base station for the UE 106, which may be either a eNB or a gNB, e.g., depending on the network configuration (e.g., LTE network, NR network, NSA network including both eNB and gNB), among various possibilities.

According to some embodiments, as part of the RRC connection setup procedure or at any of various other possible times, the UE 106 may provide one or more UE capability indications to the BS 102. The UE capability indication(s) may include information relating to any of various capabilities (or lack of capabilities) of the UE 106. At least according to some embodiments, the UE capability indication(s) may at least include information relating to the capability of the UE 106 to operate using various possible band combinations. For example, the UE 106 may determine whether certain band combinations are supported by the UE 106 (e.g., based on the RF communication capabilities of the UE 106), and report information indicative of the UE's capabilities (e.g., which may include positive information indicating supported band combinations and/or negative information indicating unsupported band combinations) to the BS 102.

At least according to some embodiments, the UE capability indication(s) relating to the supported band combinations may be based on one or more additional considerations beyond the RF communication capabilities of the UE 106. For example, the potential for various band combinations, and/or for particular channel allocations within various band combinations, to cause intermodulation issues at the UE 106, may be considered as part of determination by the UE 106 of which band combinations and/or possible channel allocations within band combinations are supported by the UE 106.

Further, if desired, the UE 106 may be capable of determining whether a given band combination or channel allocation within a band combination would result in potential intermodulation issues at the UE 106 based at least in part on any or all of cell type information for the BS 102, a network associated with the BS 102, a location of the BS 102, or any other desired information to make a more finely grained assessment of the potential for intermodulation issues for various band combinations and/or channel allocations within band combinations.

For example, according to some embodiments, cell type information, such as whether a cell has a closed subscriber group (CSG), and/or a maximum transmit power used by a cell (e.g., a p_max parameter), which may be advertised in one or more system information blocks (SIBs) by the BS 102, may be used to determine whether one or more band combinations or channel allocations within band combinations might potentially cause intermodulation issues. In such a case, if the cell is likely to use a lower transmit power (e.g., if CSG is true, and/or if p_max is relatively low), intermodulation issues may be less likely to occur than if the cell is likely to use a higher transmit power. Thus, in some instances, it might be possible for a band combination, or a channel allocation within a band combination, to be determined to be supported for some cell types (e.g., if the cell type limits the likelihood for intermodulation interference below a required threshold) but to be unsupported for other cell types (e.g., if the likelihood for intermodulation interference is considered too high in view of the expected transmit power of the cell).

As previously noted, the network associated with the BS 102 may also or alternatively be considered in determining whether a given band combination or channel allocation within a band combination would potentially cause intermodulation interference. For example, for some frequency bands, different carriers may operate in different portions of those frequency bands. Thus, in some instances, it might be possible for a band combination, or a channel allocation within a band combination, to be determined to be supported for some carriers (e.g., if the band portion(s) in which those carriers operate would not result in intermodulation interference at the UE 106) but to be unsupported for other carriers (e.g., if the band portion(s) in which those carriers operate would be likely to result in intermodulation interference at the UE 106).

Similarly, the location of the BS 102 may also or alternatively be considered in determining whether a given band combination or channel allocation within a band combination would potentially cause intermodulation interference. For example, some frequency bands (or frequency band portions) may be used in some locations but not in other locations. Thus, in some instances, it might be possible for a band combination, or a channel allocation within a band combination, to be determined to be supported for some locations (e.g., if the band portion(s) used in those locations would not result in intermodulation interference at the UE 106) but to be unsupported for other locations (e.g., if the band portion(s) used in those locations would be likely to result in intermodulation interference at the UE 106). Additionally or alternatively, if a band combination or frequency allocation within a band combination is not used in a given location, there may be no need for the UE 106 to report to the BS 102 if that band combination or frequency allocation within a band combination is supported by the UE 106.

As previously noted, the UE 106 may make use of any or all of such possible considerations when determining whether one or more possible combinations of operating bands and/or channel allocations for one or more possible combinations of operating bands are supported by the UE 106, and in turn reporting to the BS 102 with respect to the capability of the UE 106 to support operation on those possible combinations of operating bands and/or possible channel allocations for possible combinations of operating bands.

According to some embodiments, the BS 102 may consider the reported capability information for the UE 106 when determining a band allocation/channel allocation for the UE 106, e.g., to attempt to reduce or avoid the possibility of causing intermodulation issues for the UE 106. However, in such instances and/or in various other embodiments, it may still be possible for a UE 106 to experience intermodulation issues, e.g., at least under some circumstances.

At 904, the UE 106 may experience an intermodulation issue and may determine to request network intervention for the intermodulation issue. The intermodulation issue may be detected in any of various possible ways, as desired. For example, intermodulation issue detection techniques such as described herein with respect to FIG. 7, such as based on a delta between SINK or interference measurements performed while one uplink carrier is scheduled and while two uplink carriers are scheduled, may be used. Alternatively or in addition, any number of other techniques may also be used. For example, as another possibility, a wireless device may determine that an intermodulation issue is detected if a band combination currently configured for the wireless device includes multiple uplink carriers that are known to produce an intermodulation product within a frequency band in which a downlink carrier configured for the wireless device is located, e.g., even without measuring the actual intermodulation interference on the downlink carrier directly. As a still further possibility, a wireless device may determine that an intermodulation issue is detected based at least in part on any or all of an intermodulation order of the potential intermodulation issue, a current (e.g., instantaneous or filtered/averaged) power head room of the wireless device on the uplink carriers relevant to the potential intermodulation issue, and/or any intermodulation interference handling capabilities (e.g., an amount of receiver sensitivity degradation that the wireless device can mitigate, one or more intermodulation orders that the wireless device can mitigate, etc.), among various possible considerations.

At 906, the UE 106 may provide an indication of the intermodulation issue to the BS 102 based at least in part on determining that the intermodulation issue is occurring. Any number of techniques may be used to indicate the intermodulation issue, as desired. As one possibility, the UE 106 may report that it is experiencing an IMD issue using an IDC indication. As another possibility, the UE 106 may directly reuqest that the BS 102 configure the UE 106 for single uplink transmission. As a still further possibility, the UE 106 may provide a temporary capability restriction request for the IMD issue to the BS 102. Such indications may be provided in conjunction with specific band combinations (e.g., the combination of bands used for uplink and downlink communication that is resulting in the intermodulation issue). According to various embodiments, RRC signaling or one or more MAC control elements (CEs) may be used to provide the indication(s). If using RRC signaling, an IDC indication may be used, or a new message for UE reporting IMD issues and/or requesting IMD resolution assistance may be used, or a message for UE temporary capability reporting may be used, among various possibilities.

At 908, the BS 102 may reconfigure the UE 106, e.g., to attempt to resolve the intermodulation issue. For example, the UE 106 may be reconfigured to communicate using a single uplink carrier at a time, which may mitigate the possibility of intermodulation interference caused by simultaneous dual uplink carrier communication by the UE 106. This could be done using RRC signaling or using one or more MAC CEs, e.g., in a manner consistent with the signaling mechanism used in conjunction with step 906. Note that configuring the UE 106 to use one uplink carrier at a time may still allow the UE 106 to maintain dual connectivity (e.g., LTE-LTE, NR-NR, or LTE-NR dual connectivity), e.g., by way of use of time division multiplexing (TDM) techniques, frequency division multiplexing (FDM) techniques, higher layer (e.g., MAC, RLC, etc.)

multiplexing techniques, or any other desired techniques for enabling multiple uplink connections using only a single uplink carrier at a time, at least according to some embodiments.

As previously noted herein, in some instances the BS 102 may be capable of dynamically determining whether a reported potential intermodulation issue actually warrants reconfiguration of the UE 106 to use one uplink carrier at a time. For example, based on the intermodulation order, the power head room of the UE 106, and/or any interference mitigation capabilities of the UE 106, among various possible considerations, the BS 102 may in some scenarios determine to allow the UE 106 to (e.g., continue to) simultaneously utilize multiple uplink carriers even if the UE 106 is reporting a potential intermodulation issue, while in other scenarios the BS 102 may determine to (e.g., re-) configure the UE 106 to use one uplink carrier at a time when the UE 106 is reporting a potential intermodulation issue.

At 910 (e.g., at a later time), the UE 106 may determine that the intermodulation issue is resolved. For example, the UE 106 may determine that the UE 106 is unlikely to experience the intermodulation issue even if the UE is reconfigured to potentially utilize simultaneous dual uplink carrier communication. Such a determination may be made based on improved cell signal strength (e.g., from moving closer to cell center from cell edge), measurements performed during measurement windows configured to check for intermodulation issues, changes to power head room of the UE 106, and/or in any other desired manner.

At 912, the UE 106 may provide an indication that the intermodulation issue is resolved to the BS 102, based at least in part on determining that the intermodulation issue is resolved. Any number of techniques may be used to indicate resolution of the intermodulation issue, as desired. As one possibility, the UE 106 may report that the IMD issue is resolved using an IDC indication. As another possibility, the UE 106 may directly request that the BS 102 configure the UE 106 to de-configure the single uplink transmission and/or to resume dual uplink transmission. As a still further possibility, the UE 106 may request resumption of its original capability (e.g, may request removal of the temporary capability restriction for the IMD issue) from the BS 102. Such indications may be provided in conjunction with specific band combinations (e.g., the combination of bands used for uplink and downlink communication that was resulting in the intermodulation issue). According to various embodiments, RRC signaling or one or more MAC control elements (CEs) (e.g., in a manner consistent with the signaling mechanism used in conjunction with steps 906, 908) may be used to provide the indication. If using RRC signaling, an IDC indication may be used, or a new message for UE reporting IMD issues and/or requesting IMD resolution assistance may be used, or a message for UE temporary capability reporting may be used, among various possibilities.

At 914, the BS 102 may reconfigure the UE 106, e.g., based on the intermodulation issue having been resolved. For example, the UE 106 may be reconfigured to be allowed to simultaneously communicate using multiple uplink carriers, e.g., since such potentially simultaneous multiple uplink carrier usage may be expected to not cause an intermodulation issue based on the indication received from the UE 106. This could be done using RRC signaling or using one or more MAC CEs, e.g., in a manner consistent with the signaling mechanism used in conjunction with steps 906, 908, 912.

Figure 10:
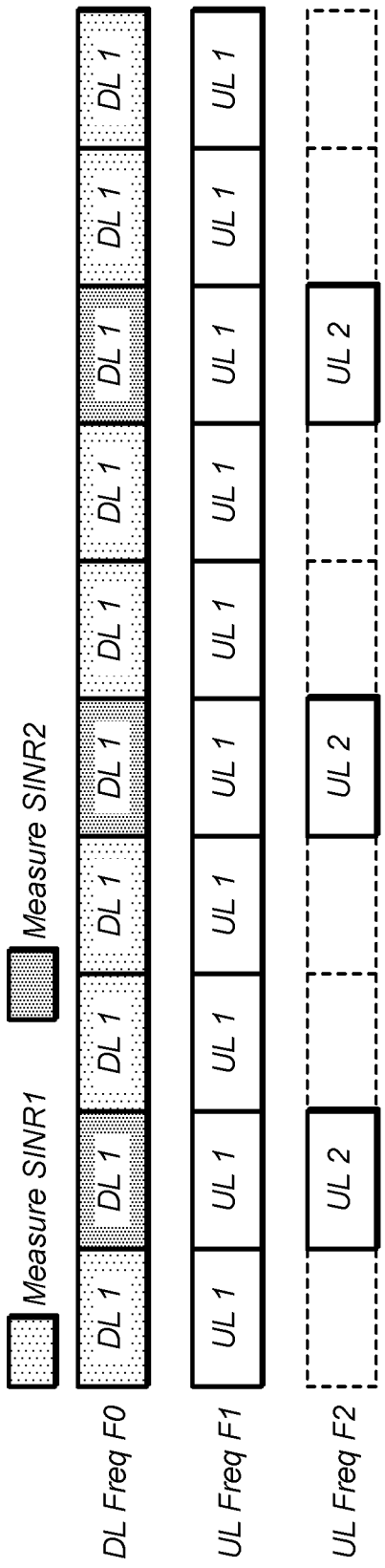
FIGS. 10-11 are possible measurement schemes that could be used in conjunction with techniques for detecting intermodulation issues, according to some embodiments.
Figure 11:
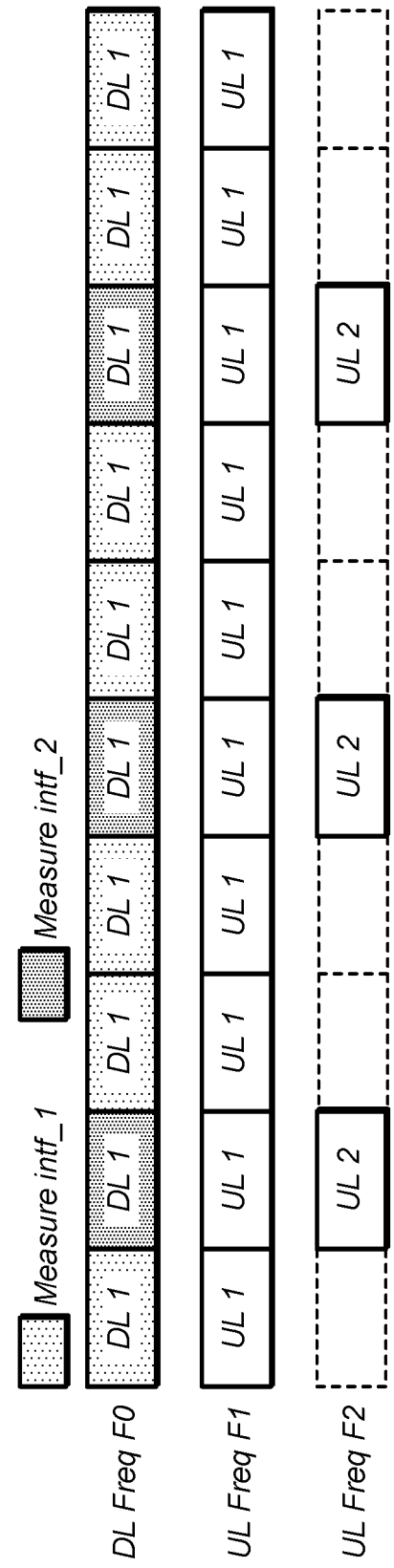

FIGS. 10-11 illustrate possible measurement schemes that could be used in conjunction with techniques for detecting intermodulation issues, such as any of the methods of FIGS. 7-9, according to various embodiments.

FIG. 10 illustrates an exemplary scheme in which first SINR measurements ("SINR1") are performed during subframes when only one uplink carrier is scheduled for a wireless device, and in which second SINR measurements ("SINR2") are performed during subframes when two uplink carriers are scheduled for the wireless device. In this scheme, the first and second SINR measurements may be performed using reference signals provided on a downlink carrier for the wireless device.

FIG. 11 illustrates an exemplary scheme in which first interference measurements ("intf_1") are performed during subframes when only one uplink carrier is scheduled for a wireless device, and in which second interference measurements ("intf_2") are performed during subframes when two uplink carriers are scheduled for the wireless device. In this scheme, the first and second interference measurements may be performed using time-frequency resources configured as zero-energy resources by the base station that are provided on a downlink carrier for the wireless device.

Figure 12:
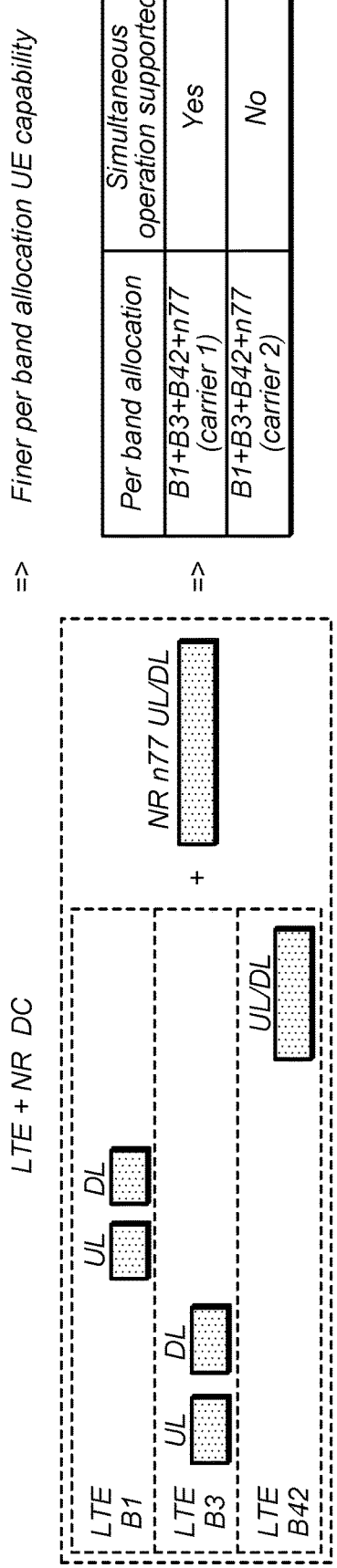
FIGS. 12-13 illustrate aspects of possible fine-grained channel allocation UE capability determination techniques, according to some embodiments.
Figure 13:
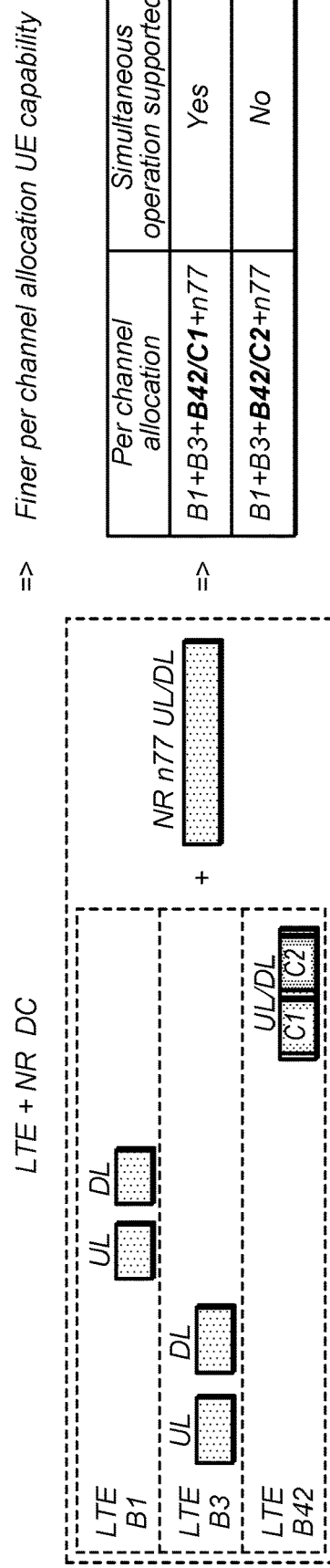

FIGS. 12-13 illustrate aspects of possible fine-grained channel allocation UE capability determination techniques, according to some embodiments. As previously noted, at least in some instances, network operators may wish to receive UE capability information relating to supported bands and band combinations from the UEs they are serving, e.g., in order to best allocate network resources to those UEs in view of a variety of considerations, potentially including avoiding causing intermodulation interference at those UEs. While it may be useful for UEs to provide any degree of band and band combination capability information, even if relatively coarsely grained, there may be additional benefits to providing more finely grained band and band combination capability information if possible, at least in some scenarios.

Thus, according to some embodiments, it may be desirable for a UE to provide UE capability information regarding supported bands and band combinations that is further based on specific channel allocations within band combinations, cell type information for a serving cell of the UE, location of the UE and/or serving cell of the UE, and/or the mobile network operator on which the UE is camped. Such techniques may, for example, be able to take advantage of the possibility that within a given band combination that could potentially have IMD issues, some possible channel allocations may still be IMD free, and that such channel allocation possibilities may be network operator specific. For example, LTE band 42 may be defined as encompassing 3400-3600 MHz, but different operators may be allocated different parts of the band, and thus may have different potential for IMD issues in view of possible combinations with other bands. Thus, by providing channel allocation based UE capability indications, there may be more opportunities to configure UEs to use multiple UL carriers, which may help with spectrum use efficiency and/or UE throughput maximization. Note that the UE capability indications may relate to whether simultaneous transmission is supported/capable or not supported/capable for a given band, band combination, or channel allocation, or to whether single uplink transmissions need to be configured for a given band combination or channel allocation, or any of various other possible UE capabilities with respect to various possible bands, band combinations, and/or channel allocations.

It may be possible for a UE to perform capability reporting based on all of the previously described considerations, or based on some subset of them, as desired. For example, according to one set of embodiments, a UE may indicate its capability per band combination it supports or doesn't support based on the network on which it is camped. In this case, the camped country and/or mobile network operator (MNO) of the UE may be considered. If desired, as a further enhancement, the UE may also indicate the capability based on cell type (e.g., as determined based on info from the SIB, such as CSG status, a p_max parameter, etc.).

FIG. 12 illustrates one example scenario in which such a technique could lead to a possible band combination being determined to be supported or not supported differently depending at least in part on a carrier network on which a UE is currently camped. In this example, a LTE+NR dual connectivity band combination including LTE bands B1, B3, and B42, along with NR band n77, may be considered by the UE. If the UE is being served by a first carrier (e.g., which may operate in a subset of the bandwidth of one or more of the considered frequency bands), the UE may determine that simultaneous operation in the band combination is supported (e.g., would not result in potential IMD issues). In contrast, if the UE is being served by a second carrier (e.g., which may operate in a different subset of the bandwidth of one or more of the considered frequency bands than the first carrier, or may operate in the entire bandwidth of the considered frequency bands), the UE may determine that simultaneous operation in the band combination is not supported (e.g., might result in potential IMD issues).

As another possibility, for band combinations with potential IMD issues, a UE may indicate its capability per possible channel allocation on the supported band combinations, and further based on the network it camps on. Thus, in this case, the UE may provide per channel allocation UE capability indications only for those channel allocations relevant to the camped country and/or MNO of the UE. The UE may still provide per band combination UE capability indications for other supported band combinations, if desired. Similar to the previous example, if desired, the UE may also indicate the capability based on cell type.

FIG. 13 illustrates one example scenario in which such a technique could lead to one channel allocation within a possible band combination being determined to be supported while another channel allocation within the same possible band combination is not supported. In this example, similar to FIG. 12, a LTE+NR dual connectivity band combination including LTE bands B1, B3, and B42, along with NR band n77, may be considered by the UE. For a first channel allocation (C1) within B42, the UE may determine that simultaneous operation in the band combination is supported (e.g., would not result in potential IMD issues). In contrast, for a second channel allocation (C2) within B42, the UE may determine that simultaneous operation in the band combination is not supported (e.g., might result in potential IMD issues).

As a still further possibility, a UE might indicate its capability per channel allocation on all supported band combinations, e.g., regardless of the network and/or country in which the UE is camped. Similar to the previous examples, if desired, the UE may also indicate the capability based on cell type. Note that such a technique may result in larger UE capability signaling than if capabilities are reported in a manner specific to the country or network currently associated with the UE.

As yet another possibility, for band combinations with potential IMD issues, a UE may indicate its capability further based on the cell type, but without the use of knowledge of a network and/or country in which the UE is camped. Such capability reporting may or may not include channel allocation specific indications, e.g., as desired.

A yet further possibility may include a stepped approach to determining UE channel allocation/band combination capability. For example, such an approach may include the UE indicating to the network on which it is camped the band combinations it supports (e.g., based on RF capabilities, without consideration of potential IMD issues). The network may in turn configure the UE with one or more detailed potential channel combinations. Based on such specific configuration information, the UE may determine and report its dual TX capability (e.g., based at least in part on potential IMD issues that could be caused by dual TX operations on those potential channel combinations) based on the indicated channel combination(s). Based on the UE's detailed capability indication, the network may then select a channel combination and indicate to the UE whether to utilize a single uplink transmission configuration or a dual uplink transmission configuration.

While in some instances it may be sufficient for wireless devices to statically report their capability to support or not support certain band/channel combinations based on their potential difficulty from intermodulation issues, in some instances it may further be useful to provide base stations with more dynamic handling/detection capabilities with respect to potential intermodulation issues, e.g., based on finer grained estimation of actual receiver sensitivity degradatation that may be experienced by a wireless device served by the base station, and/or taking into consideration potential for wireless devices to include advanced interference handling capabilities.

For example, degradation from IMD can vary depending on the specific IMD order causing the potential degradation. For example, at least in some instances, wireless devices may suffer less degradation from higher order IMD interference than from lower order IMD interference, e.g., due to receiver linearity/non-linearity considerations. Degradatation from IMD may also depend on UE transmission power, e.g., on both of the uplinks causing potential IMD interference. The "maximal sensitivity degradation" for a particular channel combination may typically be evaluated based on a peak transmitting power (e.g., both uplinks transmitting at 20 dBm for a class 2 power amplifier, as one possibility). Reduced UE transmit power may have a variable effect on potential IMD interference depending on the IMD order. For example, in some instances, for IMD-2, if transmitting power on both uplinks is reduced by 5 dB, the associated IMD may be reduced by 10 dB, while for IMD-3, if transmitting power on both uplinks is reduced by 5 dB, the associated IMD may be reduced by 15 dB. Actual degradation from IMD may also depend at least in part on whatever UE interference suppression techniques may be available to the UE.

Accordingly, in some instances, it may be helpful for a UE to periodically report its power headroom per carrier. For example, in a scenario in which a UE is configured with a maximum transmit power $P_{c\_max1}$ and $P_{c\_max2}$ for an LTE and NR uplink, respectively, each link may follow independent power control subject to the maximum transmit power, e.g., such that $P_{LTE} \leq P_{c\_max1}$ and $P_{NR} \leq P_{c\_max2}$. The power headroom per RAT may thus be reported as $PHR_{LTE} = P_{c\_max1} - P_{LTE}$ and $PHR_{NR} = P_{c\_max2} - P_{NR}$. Note that the power headroom can be filtered/averaged, if desired.

The network may be able to determine the order of IMD corresponding to a potential IMD interference issue, e.g., based on the carrier spectrum configuration. For example, for uplink frequencies F1 and F2, interference falling at F2+F1 or F2−F1 may be 2nd order IMD, while interference falling at 2*F1+F2, 2*F1−F2, 2*F2+F1, or 2*F2−F1 may be 3rd order IMD. The network may also be configured to know the maximal sensitivity degradation (MSD) for the particular channel combination, which can be specified in specification documents, and as previously noted may typically be measured under the assumption of peak TX power. Accordingly, based on the UE reported power head room, as well as the determined IMD order and MSD, the network may be able to estimate the effective amount of de-sensitivity of the potential IMD issue, and accordingly decide whether to configure the UE to operate using single UL or dual UL configuration.

As an example, consider a scenario in which a UE is operating in a channel combination in which the downlink can be interfered with by 3rd order IMD generated by simultaneous dual uplink transmission at frequency 2*F1-F2. In this example, the corresponding MSD (e.g., measured at peak TX power with both UL transmissions occurring at 20 dBm) for the channel combination may be 15 dB. The UE may be reporting that a potential intermodulation issue is occurring (e.g., reporting single UL required in a capability message). In such a scenario, if the UE is reporting PHR of 0 dB on both uplinks, the UE may actually be experiencing the MSD, and the base station may configure the UE to operate in single UL mode. However, if the UE is reporting PHR of 6 dB on the uplink on F1 and PHR of 3 dB on the uplink on F2, the real de-sensitivity may be approximately 15 dB−(6 dB*2+3 dB)=0 dB, and the base station may be able to safely configure the UE to (e.g., continue to) operate with the simultaneous dual uplink arrangement.

As previously noted, in some instances, a UE may employ implementation-specific advanced receiver capabilities, which may include capability to suppress and/or cancel interference caused by IMD from dual uplink operation. For such a UE, it may be possible to signal to the network information regarding such capability to help the network with scheduling and/or configuration. For example, the UE may be able to (e.g., statically) report which order(s) of IMD interference it is capable of handling/mitigating, which the network may be able to utilize in determining whether to configure the UE with single UL versus dual UL. Additionally or alternatively, the UE may be able to (e.g., statically) report which what level of MSD (e.g., an amount of receiver sensitivity degradation) it is capable of handling/mitigating, which the network may be able to utilize in determining whether to configure the UE with single UL versus dual UL. As a still further possibility, the UE may (e.g., semi-statically or more dynamically) decide/report on the preferred UL transmission configuration (e.g., single UL versus dual UL) based on its own transmit power, IMD order, and/or processing capability. For example, while in dual UL mode, the UE may request that the network switch the UE from dual UL to single UL when interference increases beyond the processing capability of the UE. Similarly, while in single UL mode, the UE may notify the network that it can configure the UE to use dual UL mode if needed, e.g., if the expected interference due to IMD is tolerable, due to having a sufficiently large power headroom, etc.

In the following further exemplary embodiments are provided.

One set of embodiments may include an apparatus, comprising a processing element configured to cause a wireless device to: provide an indication that the wireless device supports reporting intermodulation issues to a base station; receive an indication that the wireless device is allowed to report intermodulation issues from the base station; determine that an intermodulation issue is occurring at the wireless device; provide an indication of the intermodulation issue to the base station; and receive first configuration information from the base station, wherein the first configuration information configures the wireless device for single uplink carrier communication, wherein the configuration information is received based at least in part on the indication of the intermodulation issue.

According to some embodiments, the processing element is further configured to cause the wireless device to: determine an amount of power head room of the wireless device for each of a first uplink carrier and a second uplink carrier; and provide an indication of the amount of power head room of the wireless device for each of the first uplink carrier and the second uplink carrier to the base station.

According to some embodiments, the processing element is further configured to cause the wireless device to: determine an amount of receiver sensitivity degradation that the wireless device can mitigate; and provide an indication of the amount of receiver sensitivity degradation that the wireless device can mitigate to the base station.

According to some embodiments, the processing element is further configured to cause the wireless device to: determine one or more intermodulation orders that the wireless device can mitigate; and provide an indication of the one or more intermodulation orders that the wireless device can mitigate to the base station.

According to some embodiments, the processing element is further configured to cause the wireless device to determine that an intermodulation issue is occurring at the wireless device based on one or more of: an amount of power head room of the wireless device for each of a first uplink carrier and a second uplink carrier; an intermodulation order of the intermodulation issue; an amount of receiver sensitivity degradation that the wireless device can mitigate; or one or more intermodulation orders that the wireless device can mitigate.

According to some embodiments, the processing element is further configured to cause the wireless device to, at a later time: determine that the intermodulation issue is no longer occurring at the wireless device; provide an indication that the intermodulation issue is no longer occurring at the wireless device to the base station; and receive second configuration information from the base station, wherein the second configuration information configures the wireless device for simultaneous multiple uplink carrier communication, wherein the second configuration information is received based at least in part on the indication that the intermodulation issue is no longer occurring at the wireless device.

According to some embodiments, the indication that the wireless device supports reporting intermodulation issues and the indication that the wireless device is allowed to report intermodulation issues are exchanged during a radio resource control connection setup procedure.

According to some embodiments, to determine that an intermodulation issue is occurring, the processing element is further configured to cause the wireless device to: calculate a difference between interference on a downlink carrier measured when a single uplink carrier is scheduled for the wireless device and interference on a downlink carrier measured when multiple uplink carriers are scheduled for the wireless device; and determine that the difference is greater than an interference threshold.

According to some embodiments, determining that the intermodulation issue is occurring at the wireless device is performed based at least in part on an uplink band combination configured for the wireless device for multiple uplink carrier communication.

According to some embodiments, the indication of the intermodulation issue and the first configuration information are exchanged using radio resource control (RRC) signaling.

According to some embodiments, the indication of the intermodulation issue and the first configuration information are exchanged using media access control (MAC) control elements.

According to some embodiments, the processing element is further configured to cause the wireless device to: determine one or more of a network associated with the base station or a location associated with the base station; determine that one or more combinations of operating bands would result in potential intermodulation issues based as least in part on one or more of the network associated with the base station or the location associated with the base station; and provide an indication to the base station based at least in part on determining that the one or more combinations of operating bands would result in potential intermodulation issues.

According to some embodiments, the processing element is further configured to cause the wireless device to: determine cell type information for a cell provided by the base station; determine whether one or more combinations of operating bands would result in potential intermodulation issues based as least in part on the cell type information for the base station; and provide an indication to the base station for each combination of operating bands that is determined to potentially cause intermodulation issues.

According to some embodiments, the processing element is further configured to cause the wireless device to: determine whether one or more possible channel allocations for one or more possible combinations of operating bands would result in potential intermodulation issues; and provide a wireless device capability indication to the base station based at least in part on determining whether the one or more possible channel allocations for the one or more possible combinations of operating bands would result in potential intermodulation issues.

Another set of embodiments may include a wireless device, comprising: an antenna; a radio coupled to the antenna; and a processing element coupled to the radio; wherein the wireless device is configured to: perform first measurements on a downlink carrier while one uplink carrier is scheduled for the wireless device; perform second measurements on the downlink carrier while two uplink carriers are scheduled for the wireless device; and provide information based on the first and second measurements to a base station.

According to some embodiments, the first measurements and the second measurements are performed on reference signal resources of the downlink carrier, wherein the first measurements and the second measurements comprise signal to interference plus noise (SINK) measurements.

According to some embodiments, the first measurements and the second measurements are performed on zero power resources of the downlink carrier, wherein the first measurements and the second measurements comprise interference measurements.

According to some embodiments, the information provided to the base station comprises results of the first measurements and the second measurements.

According to some embodiments, the information provided to the base station comprises a delta between results of the first measurements and the second measurements.

According to some embodiments, the wireless device is further configured to: determine, based at least in part on the first and second measurements, that an intermodulation issue is currently occurring at the wireless device, wherein the information based on the first and second measurements is provided to the base station based at least in part on determining that an intermodulation issue is currently occurring at the wireless device.

According to some embodiments, the wireless device is further configured to: receive an indication of an intermodulation threshold from the base station; wherein determining that an intermodulation issue is currently occurring at the wireless device is further based at least in part on the intermodulation threshold indicated by the base station.

A further set of embodiments may include an apparatus, comprising a processing element configured to cause a base station to: receive an indication of a potential intermodulation issue at a wireless device from the wireless device; receive an indication of an amount of power head room for each of a first uplink carrier and a second uplink carrier of the wireless device; and determine whether to configure the wireless device to use a single uplink carrier at a time or to allow simultaneous use of multiple uplink carriers based at least in part on the indication of a potential intermodulation issue at the wireless device and the indication of an amount of power head room for each of a first uplink carrier and a second uplink carrier of the wireless device.

According to some embodiments, the processing element is further configured to cause the base station to: determine an intermodulation order of the potential intermodulation issue, wherein determining whether to configure the wireless device to use a single uplink carrier at a time or to allow simultaneous use of multiple uplink carriers is further based at least in part on the intermodulation order of the potential intermodulation issue.

According to some embodiments, the processing element is further configured to cause the base station to: determine an effective amount of receiver sensitivity degradation for the wireless device based at least in part on the amount of power head room of the wireless device for each of the first uplink carrier and the second uplink carrier and the intermodulation order of the potential intermodulation issue; determine to configure the wireless device to use a single uplink carrier at a time if the effective amount of receiver sensitivity degradation for the wireless device is above a receiver sensitivity degradation threshold; and determine to configure the wireless device to allow simultaneous use of multiple uplink carriers if the effective amount of receiver sensitivity degradation for the wireless device is below the receiver sensitivity degradation threshold.

According to some embodiments, the processing element is further configured to cause the base station to: receive information indicating an amount of receiver sensitivity degradation that the wireless device can mitigate, wherein determining whether to configure the wireless device to use a single uplink carrier at a time or to allow simultaneous use of multiple uplink carriers is further based at least in part on the amount of receiver sensitivity degradation that the wireless device can mitigate.

According to some embodiments, the processing element is further configured to cause the base station to: receive information indicating one or more intermodulation orders that the wireless device can mitigate from the wireless device, wherein determining whether to configure the wireless device to use a single uplink carrier at a time or to allow simultaneous use of multiple uplink carriers is further based at least in part on the information indicating one or more intermodulation orders that the wireless device can mitigate.

Yet another set of embodiments may include a base station, comprising: an antenna; a radio coupled to the antenna; and a processing element coupled to the radio; wherein the base station is configured to: receive information relating to measurements performed on a downlink carrier while one uplink carrier is scheduled and measurements performed on the downlink carrier while two uplink carriers are scheduled from a wireless device; determine that an intermodulation issue is currently occurring at the wireless device based at least in part on the received information; and configure the wireless device to use a single uplink carrier at a time based at least in part on the intermodulation issue.

According to some embodiments, the base station is further configured to: schedule a first measurement window while one uplink carrier is scheduled for the wireless device and a second measurement window while two uplink carriers are scheduled for the wireless device; and provide configuration information configuring the wireless device to perform the measurements performed on the downlink carrier while one uplink carrier is scheduled during the first measurement window and to perform the measurements performed on the downlink carrier while two uplink carriers are scheduled during the second measurement window.

According to some embodiments, the information relating to measurements performed on a downlink carrier while one uplink carrier is scheduled and measurements performed on the downlink carrier while two uplink carriers are scheduled comprises results of the measurements performed on the downlink carrier while one uplink carrier is scheduled and results of the measurements performed on the downlink carrier while two uplink carriers are scheduled.

According to some embodiments, the information relating to measurements performed on a downlink carrier while one uplink carrier is scheduled and measurements performed on the downlink carrier while two uplink carriers are scheduled comprises a value calculated by the wireless device based at least in part on the measurements performed on a downlink carrier while one uplink carrier is scheduled and the measurements performed on the downlink carrier while two uplink carriers are scheduled.

According to some embodiments, the information relating to measurements performed on a downlink carrier while one uplink carrier is scheduled and measurements performed on the downlink carrier while two uplink carriers are scheduled comprises an indication that an intermodulation issue is currently occurring at the wireless device.

According to some embodiments, the base station is further configured to, at a later time: determine that an intermodulation issue is no longer occurring at the wireless device; and configure the wireless device to allow simultaneous use of multiple uplink carriers based at least in part on determining that an intermodulation issue is no longer occurring at the wireless device.

A still further set of embodiments may include a base station, comprising: an antenna; a radio coupled to the antenna; and a processing element coupled to the radio; wherein the base station is configured to: receive an indication of a potential intermodulation issue at a wireless device from the wireless device; determine that an intermodulation issue is currently occurring at the wireless device based at least in part on the indication of a potential intermodulation issue at the wireless device; and configure the wireless device to use a single uplink carrier at a time based at least in part on the intermodulation issue.

According to some embodiments, the base station is further configured to: receive an indication of an amount of power head room of the wireless device for each of a first uplink carrier and a second uplink carrier; determine an intermodulation order of the potential intermodulation issue; and determine an effective amount of receiver sensitivity degradation for the wireless device based at least in part on the amount of power head room of the wireless device for each of the first uplink carrier and the second uplink carrier and the intermodulation order of the potential intermodulation issue, wherein determining that an intermodulation issue is currently occurring at the wireless device is further based at least in part on the effective amount of receiver sensitivity degradation for the wireless device.

According to some embodiments, the base station is further configured to: receive an indication of an amount of receiver sensitivity degradation that the wireless device can mitigate from the wireless device, wherein determining that an intermodulation issue is currently occurring at the wireless device is further based at least in part on the amount of receiver sensitivity degradation that the wireless device can mitigate.

According to some embodiments, the base station is further configured to: receive an indication of one or more intermodulation orders that the wireless device can mitigate from the wireless device, wherein determining that an intermodulation issue is currently occurring at the wireless device is further based at least in part on the amount of receiver sensitivity degradation that the wireless device can mitigate.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising a processing element configured to cause a wireless device to:
    determine a potential intermodulation issue for a dual connectivity configuration of Long Term Evolution (LTE) and New Radio (NR) at the wireless device for one or more band combinations;
    provide, to a base station, based on said determining the potential intermodulation issue, a capability of whether simultaneous transmission on dual uplink carriers is supported for the dual connectivity configuration of LTE and NR for one or more band combinations;
    provide, to the base station, an indication that the wireless device supports reporting intermodulation issues associated with dual connectivity on LTE and NR;
    receive an indication that the wireless device is allowed to report the intermodulation issues from the base station;
    determine that an intermodulation issue associated with dual connectivity of LTE and NR is occurring at the wireless device;
    provide an indication of the intermodulation issue to the base station; and
    receive first configuration information from the base station, wherein the first configuration information configures the wireless device for single uplink carrier communication, wherein the configuration information is received based at least in part on one or more of the capability and the indication of the intermodulation issue.

2. The apparatus of claim 1, wherein the processing element is further configured to cause the wireless device to:
    determine an amount of power head room of the wireless device for each of a first uplink carrier and a second uplink carrier; and
    provide an indication of the amount of power head room of the wireless device for each of the first uplink carrier and the second uplink carrier to the base station.

3. The apparatus of claim 1, wherein the processing element is further configured to cause the wireless device to:
    determine an amount of receiver sensitivity degradation that the wireless device can mitigate; and
    provide an indication of the amount of receiver sensitivity degradation that the wireless device can mitigate to the base station.

4. The apparatus of claim 1, wherein said determining the potential intermodulation issue is based on an intermodulation order of the potential intermodulation issue.

5. The apparatus of claim 1, wherein the processing element is further configured to cause the wireless device to determine that an intermodulation issue is occurring at the wireless device based on one or more of:
    an amount of power head room of the wireless device for each of a first uplink carrier and a second uplink carrier;
    an intermodulation order of the intermodulation issue;
    an amount of receiver sensitivity degradation that the wireless device can mitigate; or
    one or more intermodulation orders that the wireless device can mitigate.

6. The apparatus of claim 1, wherein the processing element is further configured to cause the wireless device to, at a later time:
    determine that the intermodulation issue is no longer occurring at the wireless device;
    provide an indication that the intermodulation issue is no longer occurring at the wireless device to the base station; and
    receive second configuration information from the base station, wherein the second configuration information configures the wireless device for simultaneous multiple uplink carrier communication, wherein the second configuration information is received based at least in part on the indication that the intermodulation issue is no longer occurring at the wireless device.

7. The apparatus of claim 1,
    wherein the indication that the wireless device supports reporting intermodulation issues and the indication that the wireless device is allowed to report intermodulation issues are exchanged during a radio resource control connection setup procedure.

8. The apparatus of claim 1,
    wherein determining that the intermodulation issue is occurring at the wireless device is performed based at least in part on an uplink band combination configured for the wireless device for multiple uplink carrier communication.

9. The apparatus of claim 1, wherein the indication of the intermodulation issue and the first configuration information are exchanged using one of:
    radio resource control (RRC) signaling; or
    media access control (MAC) control elements.

10. The apparatus of claim 1, wherein the processing element is further configured to cause the wireless device to:
    determine one or more of a network associated with the base station, a location associated with the base station, cell type information for a cell provided by the base station, or one or more possible channel allocations for a configured combination of operating bands; and
    provide the indication of the intermodulation issue to the base station based at least in part on one or more of the network associated with the base station, the location associated with the base station, the cell type information for the cell provided by the base station, or the one or more possible channel allocations for the configured combination of operating bands.

11. An apparatus, comprising a processing element configured to cause a base station to:
    receive, from a wireless device, a capability indicating that simultaneous transmission on dual uplink carriers is not supported by the wireless device due to a potential intermodulation issue associated with a dual connectivity configuration of LTE and NR for one or more band combinations;

receive, from the wireless device, an indication that the wireless device supports reporting intermodulation issues associated with dual connectivity on LTE and NR;

provide an indication that the wireless device is allowed to report the intermodulation issues;

receive, from the wireless device, an indication that an intermodulation issue associated with dual connectivity on LTE and NR is occurring at the wireless;

determine to configure the wireless device to use a single uplink carrier at a time based at least in part on one or more of the capability and the indication of the intermodulation issue.

12. The apparatus of claim 11, wherein determining to configure the wireless device to use a single uplink carrier at a time is further based at least in part on an intermodulation order of the potential intermodulation issue.

13. The apparatus of claim 12, wherein the processing element is further configured to cause the base station to:

receive an indication of an amount of power head room for each of a first uplink carrier and a second uplink carrier of the wireless device;

determine an effective amount of receiver sensitivity degradation for the wireless device based at least in part on the amount of power head room of the wireless device for each of the first uplink carrier and the second uplink carrier and the intermodulation order of the potential intermodulation issue; and determine to configure the wireless device to use a single uplink carrier at a time further based on the effective amount of receiver sensitivity degradation for the wireless device being above a receiver sensitivity degradation threshold.

14. The apparatus of claim 11, wherein the processing element is further configured to cause the base station to:

receive information indicating an amount of receiver sensitivity degradation that the wireless device can mitigate, wherein determining to configure the wireless device to use a single uplink carrier at a time is further based at least in part on the amount of receiver sensitivity degradation that the wireless device can mitigate.

15. The apparatus of claim 11, wherein the processing element is further configured to cause the base station to:

receive information indicating one or more intermodulation orders that the wireless device can mitigate from the wireless device, wherein determining to configure the wireless device to use a single uplink carrier at a time is further based at least in part on the information indicating one or more intermodulation orders that the wireless device can mitigate.

16. A base station, comprising:
an antenna;
a radio coupled to the antenna; and
a processing element coupled to the radio;
wherein the base station is configured to:
receive, from a wireless device, a capability indicating that simultaneous transmission on dual uplink carriers is not supported by the wireless device due to a potential intermodulation issue associated with a dual connectivity configuration of LTE and NR for one or more band combinations;

receive, from the wireless device, an indication that the wireless device supports reporting intermodulation issues associated with dual connectivity on LTE and NR;

provide an indication that the wireless device is allowed to report the intermodulation issues;

receive, from the wireless device, an indication that an intermodulation issue associated with dual connectivity on LTE and NR is occurring at the wireless device; and configure the wireless device to use a single uplink carrier at a time based at least in part on one or more of the capability and the intermodulation issue.

17. The base station of claim 16, wherein the base station is further configured to:

receive an indication of an amount of power head room of the wireless device for each of a first uplink carrier and a second uplink carrier;

determine an intermodulation order of the potential intermodulation issue; and determine an effective amount of receiver sensitivity degradation for the wireless device based at least in part on the amount of power head room of the wireless device for each of the first uplink carrier and the second uplink carrier and the intermodulation order of the potential intermodulation issue, wherein determining that an intermodulation issue is currently occurring at the wireless device is further based at least in part on the effective amount of receiver sensitivity degradation for the wireless device.

18. The base station of claim 16, wherein the base station is further configured to:

receive an indication of an amount of receiver sensitivity degradation that the wireless device can mitigate from the wireless device, wherein determining that an intermodulation issue is currently occurring at the wireless device is further based at least in part on the amount of receiver sensitivity degradation that the wireless device can mitigate.

19. The base station of claim 16, wherein the base station is further configured to:

receive an indication of one or more intermodulation orders that the wireless device can mitigate from the wireless device, wherein determining that an intermodulation issue is currently occurring at the wireless device is further based at least in part on the indication of one or more intermodulation orders that the wireless device can mitigate.

20. The base station of claim 16, wherein the base station is further configured to, at a later time:

determine that an intermodulation issue is no longer occurring at the wireless device; and configure the wireless device to allow simultaneous use of multiple uplink carriers based at least in part on determining that an intermodulation issue is no longer occurring at the wireless device.

* * * * *